(12) United States Patent
Qiao

(10) Patent No.: US 11,928,872 B2
(45) Date of Patent: Mar. 12, 2024

(54) METHODS AND APPARATUSES FOR RECOGNIZING TEXT, RECOGNITION DEVICES AND STORAGE MEDIA

(71) Applicant: SHANGHAI GOLDWAY INTELLIGENT TRANSPORTATION SYSTEM CO., LTD., Shanghai (CN)

(72) Inventor: Liang Qiao, Shanghai (CN)

(73) Assignee: SHANGHAI GOLDWAY INTELLIGENT TRANSPORTATION SYSTEM CO., LTD., Shanghai (CN)

( * ) Notice: Subject to any disclaimer, the term of this patent is extended or adjusted under 35 U.S.C. 154(b) by 0 days.

(21) Appl. No.: 17/778,088

(22) PCT Filed: Nov. 20, 2020

(86) PCT No.: PCT/CN2020/130654
§ 371 (c)(1),
(2) Date: May 19, 2022

(87) PCT Pub. No.: WO2021/098861
PCT Pub. Date: May 27, 2021

(65) Prior Publication Data
US 2022/0415069 A1 Dec. 29, 2022

(30) Foreign Application Priority Data
Nov. 21, 2019 (CN) .......................... 201911147915.4

(51) Int. Cl.
*G06V 20/62* (2022.01)
*G06V 10/26* (2022.01)
(Continued)

(52) U.S. Cl.
CPC .............. *G06V 20/62* (2022.01); *G06V 10/26* (2022.01); *G06V 10/44* (2022.01); *G06V 10/454* (2022.01);
(Continued)

(58) Field of Classification Search
CPC ..................................................... G06V 20/62
See application file for complete search history.

(56) References Cited

U.S. PATENT DOCUMENTS 7,043,080 B1   5/2006   Dolan
2010/0053707 A1   3/2010   Mori
(Continued)

FOREIGN PATENT DOCUMENTS

CN   104809436 A   7/2015
CN   107977620 A   5/2018
(Continued)

OTHER PUBLICATIONS

Machine translation of CN110287960, espacenet, pp. 1-15, Apr. 27, 2023 (Year: 2023).*
(Continued)

*Primary Examiner* — Edward Park
(74) *Attorney, Agent, or Firm* — Ladas & Parry, LLP

(57) ABSTRACT

Methods and an apparatuses for recognizing a text, recognition devices and storage media are provided, which belong to the field of text detections. A method includes: extracting, by the recognition device, a feature map of a to-be-recognized image, then determining segmentation information of a text region of the to-be-recognized image based on a preset segmentation network and the feature map, and then determining boundary key points in the text region based on the segmentation information, and then converting a text in the text region into a text with a target arrangement sequence based on the boundary key points and then inputting the text obtained by conversion into a preset recognition model for recognition processing.

18 Claims, 6 Drawing Sheets

(51) Int. Cl.
  *G06V 10/44* (2022.01)
  *G06V 10/82* (2022.01)
  *G06V 30/10* (2022.01)
  *G06V 30/148* (2022.01)
  *G06V 30/19* (2022.01)

(52) U.S. Cl.
  CPC .............. *G06V 10/82* (2022.01); *G06V 30/10* (2022.01); *G06V 30/15* (2022.01); *G06V 30/19027* (2022.01)

(56) References Cited

U.S. PATENT DOCUMENTS

| | | |
|---|---|---|
| 2014/0200689 A1 | 7/2014 | Utsunomiya et al. |
| 2018/0033147 A1 | 2/2018 | Becker et al. |
| 2019/0272438 A1 | 9/2019 | Liu et al. |
| 2020/0134366 A1 | 4/2020 | Xu et al. |

FOREIGN PATENT DOCUMENTS

| | | | |
|---|---|---|---|
| CN | 108288088 | A | 7/2018 |
| CN | 108520254 | A | 9/2018 |
| CN | 108549893 | A | 9/2018 |
| CN | 108647681 | A | 10/2018 |
| CN | 109829437 | A | 5/2019 |
| CN | 110032969 | A | 7/2019 |
| CN | 110211130 | A | 9/2019 |
| CN | 110287960 | * | 9/2019 |
| CN | 110287960 | A | 9/2019 |
| CN | 110309824 | A | 10/2019 |
| CN | 110458918 | A | 11/2019 |
| CN | 110837835 | A | 2/2020 |
| CN | 111612009 | A | 9/2020 |
| WO | 2019192397 | A1 | 10/2019 |

OTHER PUBLICATIONS

Lyu et al., "Multi-Oriented Scene Text Detection via Corner Localization and Region Segmentation" 2018, CVPR, pp. 7553-7563 (Year: 2018).*

State Intellectual Property Office of the People's Republic of China, Office Action and Search Report Issued in Application No. 201911147915.4, dated Aug. 1, 2022, 17 pages (Submitted with Machine Translation).

Zhida Huang et al., "Mask R-CNN with Pyramid Attention Network for Scene Text Detection",2019 IEEE Winter Conference on Applications of Computer Vision, Nov. 22, 2018, 9 pages.

Zhu Jianfei et al, "Combination of regression and clustering for handwritten text line extraction", Journal of Profile Graphics,vol. 23.No.8,Aug. 2018 (Submitted with Machine Translation).

Sun Yufei, "Studies of OCR Technology for Degraded Document Images", China doctoral dissertation full text database, Information technology, Feb. 15, 2007 (Submitted with Machine Translation).

ISA State Intellectual Property Office of the People's Republic of China, International Search Report Issued in Application No. PCT/CN2020/130654, dated Feb. 22, 2021, and English Translation provided by WIPO.

ISA State Intellectual Property Office of the People's Republic of China, International written Opinion Issued in Application No. PCT/CN2020/130654, dated Feb. 22, 2021, and English Translation provided by Google Translate.

Liu Yuliang et.al, "Curved Scene Text Detection via Transverse and Longitudinal Sequence Connection," Pattern Recognition 90 (2019), 337-345, Feb. 5, 2019, 9 pages.

Wang Xiaobing et.al, "Arbitrary Shape Scene Text Detection with Adaptive Text Region Representation", 2019 IEEE/CVF conference on computer vision and patten recognition (CVPR), May 15, 2019, 10 pages.

Liu Y, Jin L, Zhang S, et al., "Detecting Curve Text in the Wild: New Dataset and New Solution" arXiv:1712.02170v1 [cs.CV] Dec. 6, 2017, 9 pages.

Li X, Wang W, Hou W, et al., "Shape Robust Text Detection with Progressive Scale Expansion Network" arXiv:1903.12473v2 [cs.CV] Jul. 29, 2019, 13 pages.

Fred L. Bookstein, "Principal warps: thin-plate splines and the decomposition of deformations," IEEE Transactions on Pattern Analysis & Machine Intelligence, vol. 11, No. 6, Jun. 1989, 567-585, 19 pages.

Lin T Y, Dollár P, Girshick R, et al., "Feature Pyramid Networks for Object Detection 2016," arXiv:1612.03144v2 [cs.CV] Apr. 19, 2017, 10 pages.

Hu J, Shen L, Sun G., "Squeeze-and-Excitation Networks," arXiv:1709.01507v4 [cs.CV] May 16, 2019, 13 pages.

Shi B, Bai X, Yao C., "An end-to-end trainable neural network for image-based sequence recognition and its application to scene text recognition," arXiv:1507.05717v1 [cs.CV] Jul. 21, 2015, 9 pages.

Wang Tao, Jiang Jiahe, "Text recognition in any direction based on semantic segmentation," Applied Science and Technology vol. 45, No. 4, Jun. 2018, 6 pages, with machine English translation.

* cited by examiner

METHODS AND APPARATUSES FOR RECOGNIZING TEXT, RECOGNITION DEVICES AND STORAGE MEDIA

CROSS REFERENCE TO RELATED APPLICATIONS

This application is a U.S. National Stage of International Application No. PCT/CN2020/130654 filed on Nov. 20, 2020, which claims priority to Chinese Patent Application No. 201911147915.4 filed on Nov. 21, 2019, the entire contents of the above referred applications are incorporated herein by reference.

TECHNICAL FIELD

The present disclosure relates to the field of text detections, and in particular to methods and apparatuses for recognizing a text, recognition devices and storage media.

BACKGROUND

Optical Character Recognition (OCR) technology, as an important information collection or input means, can perform input in place of human and liberate laborers and therefore be applied to multiple scenarios. For example, the OCR technology may be applied to vehicle plate recognition, identity card information recognition, and portable document format (PDF) text analysis and the like. In a general flow of the OCR technology, detection is performed and then recognition is carried out, that is, detection of text region is firstly performed for an input image and then text recognition is performed in the detected text region.

In the related arts, when detection of text region is performed for an input image, one quadrilateral text box (e.g. a rectangular text box or convex quadrilateral box) is obtained as an output result and then recognition is performed for contents in the rectangular text box or convex quadrilateral box.

Because curved texts are present in many scenarios, for example, in invoice stamp or advertising board or the like, if only quadrilaterals are used as detection result, it is possible that the quadrilaterals do not contain the curved texts, thus leading to a relatively low recognition rate of the curved texts.

SUMMARY

In order to solve the problem of a relatively low recognition rate of curved texts, in an embodiment of the present disclosure, there is provided a method and an apparatus for recognizing a text, a recognition device and a storage medium. The technical solution is described below.

According to a first aspect, in the present disclosure, there is provided a method of recognizing a text. The method includes:

according to a preset feature extraction network and a to-be-recognized image, extracting a feature map of the to-be-recognized image;

according to a preset segmentation network and the feature map, determining segmentation information of a text region of the to-be-recognized image;

according to the segmentation information, determining boundary key points in the text region;

according to the boundary key points, converting a text in the text region into a text with a target arrangement sequence; and inputting the text obtained by conversion into a preset recognition model for recognition processing.

In some examples, according to the segmentation information, determining the boundary key points in the text region includes:

according to offsets between each pixel point in a first boundary region and two boundary key points in the first boundary region in the segmentation information, determining position information of the two boundary key points in the first boundary region; and according to offsets between each pixel point in a second boundary region and two boundary key points in the second boundary region in the segmentation information, determining position information of the two boundary key points in the second boundary region, where the first boundary region is located at a head portion of the text region, and the second boundary region is located at a tail portion of the text region; and according to the position information of the two boundary key points in the first boundary region and the position information of the two boundary key points in the second boundary region, determining other boundary key points other than boundary key points in the first boundary region and boundary key points in the second boundary region in the text region.

In some examples, the method further includes:

determining arrangement information of the text in the text region;

according to the position information of the two boundary key points in the first boundary region and the position information of the two boundary key points in the second boundary region, determining the other boundary key points other than the boundary key points in the first boundary region and the boundary key points in the second boundary region in the text region includes:

according to the arrangement information of the text, the position information of the two boundary key points in the first boundary region and the position information of the two boundary key points in the second boundary region, determining other boundary key points other than boundary key points in the first boundary region and boundary key points in the second boundary region in the text region.

In some examples, according to the arrangement information of the text, the position information of the two boundary key points in the first boundary region and the position information of the two boundary key points in the second boundary region, determining the other boundary key points other than the boundary key points in the first boundary region and the boundary key points in the second boundary region in the text region includes:

in response to determining that the arrangement information indicates horizontal arrangement, according to the position information of a first boundary key point in the first boundary region and the position information of a second boundary key point in the second boundary region, determining other boundary key points other than the first boundary key point and the second boundary key point on an upper boundary of the text region, and according to the position information of a fourth boundary key point in the first boundary region and the position information of a third boundary key point in the second boundary region, determining other boundary key points other than the third boundary key point and the fourth boundary key point on a lower boundary of the text region; and in response to determining that the arrangement information indicates longitudinal arrangement, according to the position information of the first boundary key point in the first boundary region and the position information of the second boundary key point in the second boundary region, determining other boundary key points other than the first boundary key point and the second boundary key point on a left boundary of the text region, and according to the position information of the fourth boundary key point in the first boundary region and the position information of the third boundary key point in the second boundary region, determining other boundary key points other than the third boundary key point and the fourth boundary key point on a right boundary of the text region.

In some examples, according to the position information of the first boundary key point in the first boundary region and the position information of the second boundary key point in the second boundary region, determining the other boundary key points other than the first boundary key point and the second boundary key point on the upper boundary of the text region includes:

according to the position information of the first boundary key point in the first boundary region and the position information of the second boundary key point in the second boundary region, determining first abscissa information of a first preset number of position points, where the first preset number of position points are located on a first connection line and obtained by equally dividing the first connection line to a target value, the target value is equal to the first preset number plus 1, and the first connection line is a line connecting the first boundary key point and the second boundary key point; and according to the first abscissa information, determining other boundary key points other than the first boundary key point and the second boundary key point on the upper boundary of the text region.

In some examples, the segmentation information includes offsets between a pixel point belonging to the text in the text region and the upper boundary of the text region;

according to the first abscissa information, determining the other boundary key points other than the first boundary key point and the second boundary key point on the upper boundary of the text region includes:

for the first abscissa information of any position point in the first preset number of position points, according to an abscissa interval corresponding to the first abscissa information of the position point, determining a pixel point belonging to the text and having an abscissa located in the abscissa interval in the text region; and determining the first abscissa information of the position point as an abscissa of a boundary key point corresponding to the position point, and according to an offset between the determined pixel point and the upper boundary, determining an ordinate of the boundary key point corresponding to the position point, where the boundary key point corresponding to the position point is located on the upper boundary of the text region and the upper boundary includes the first boundary key point and the second boundary key point.

In some examples, according to the position information of the fourth boundary key point in the first boundary region and the position information of the third boundary key point in the second boundary region, determining the other boundary key points other than the third boundary key point and the fourth boundary key point on the lower boundary of the text region includes:

according to the position information of the fourth boundary key point in the first boundary region and the position information of the third boundary key point in the second boundary region, determining second abscissa information of a first preset number of position points, where the first preset number of position points are located on a second connection line and obtained by equally dividing the second connection line to a target value, the target value is equal to the first preset number plus 1, and the second connection line is a line connecting the third boundary key point and the fourth boundary key point; and according to the second abscissa information, determining other boundary key points other than the third boundary key point and the fourth boundary key point on the lower boundary of the text region.

In some examples, the segmentation information includes an offset between a pixel point belonging to the text in the text region and the lower boundary of the text region;

according to the second abscissa information, determining the other boundary key points other than the third boundary key point and the fourth boundary key point on the lower boundary of the text region includes:

for the second abscissa information of any position point in the first preset number of position points, according to an abscissa interval corresponding to the second abscissa information of the position point, determining a pixel point belonging to the text and having an abscissa located in the abscissa interval in the text region; and determining the second abscissa information of the position point as an abscissa of a boundary key point corresponding to the position point, and according to an offset between the determined pixel point and the lower boundary, determining an ordinate of the boundary key point corresponding to the position point, where the boundary key point corresponding to the position point is located on the lower boundary of the text region and the lower boundary includes the third boundary key point and the fourth boundary key point.

In some examples, according to the boundary key points, converting the text in the text region into the text with the target arrangement sequence includes:

by using Thin Plate Spline (TPS), performing template matching for the boundary key points to convert the text in the text region into a text with a target arrangement sequence.

In some examples, according to the preset feature extraction network and the to-be-recognized image, extracting the feature map of the to-be-recognized image includes:

inputting the to-be-recognized image into the preset feature extraction network to extract a feature map of a preset size of the to-be-recognized image;

performing preset convolutional processing for the feature map of the preset size;

performing convolutional kernel correction for the feature map subjected to convolutional processing; and obtaining the feature map of the to-be-recognized image by performing up-sampling for the feature map subjected to convolutional kernel correction and then performing fusion processing for the up-sampled feature map and an upper layer feature map of the feature map of the preset size.

In some examples, performing convolutional kernel correction for the feature map subjected to convolutional processing includes:

obtaining a first feature map by performing convolutional processing of a first convolutional kernel for the feature map subjected to convolutional processing, and obtaining a second feature map by performing convolutional processing of a second convolutional kernel for the first feature map;

obtaining a third feature map by performing convolutional processing of a third convolutional kernel for the second feature map, and obtaining a fourth feature map by performing convolutional processing of a fourth convolutional kernel for the second feature map; where the third convolutional kernel has a size of m*n, the fourth convolutional kernel has a size of n*m, m and n are positive integers and m is less than n;

obtaining a fifth feature map by performing channel splicing for the first feature map, the second feature map, the third feature map and the fourth feature map; and obtaining a feature map subjected to convolutional kernel correction by performing compression activation processing for the fifth feature map.

In some examples, the method further includes:

obtaining a sample set, where the sample set includes a second preset number of images labeling the text region;

for a target text region in the sample set, determining a first boundary key point, a second boundary key point, a third boundary key point and a fourth boundary key point in the target text region;

obtaining a first boundary region, a second boundary region, a third boundary region, a fourth boundary region, a text-located region, and a background region of the target text region by performing segmentation for the target text region, and taking the first boundary region, the second boundary region, the third boundary region, the fourth boundary region, the text-located region, and the background region as segmentation true values;

determining offsets between each pixel point in the first boundary region and the first boundary key point and the third boundary key point, and offsets between each pixel point in the second boundary region and the second boundary key point and the fourth boundary key point as boundary key point true values;

determining minimum offsets between each pixel point in the text-located region in the target text region and the upper boundary, the lower boundary, the left boundary and the left boundary of the target text region as boundary offset true values; and according to respective segmentation true value, respective boundary key point true value and respective boundary offset true value corresponding to each text region in the sample set, training a segmentation network training model to obtain a segmentation network.

In some examples, determining the arrangement information of the text in the text region includes:

determining a maximum abscissa and a maximum ordinate in the text region, and determining a minimum abscissa and a minimum ordinate in the text region;

according to the maximum abscissa, the maximum ordinate, the minimum abscissa and the minimum ordinate, determining a circumscribed rectangle of the text region; and in response to determining that a length of the circumscribed rectangle is greater than a width of the circumscribed rectangle, determining that the arrangement of the text in the text region is horizontal arrangement, and in response to determining that the length of the circumscribed rectangle is smaller than the width of the circumscribed rectangle, determining that the arrangement of the text in the text region is longitudinal arrangement.

According to a second aspect, in the present disclosure, there is provided a computer readable storage medium. The computer readable storage medium stores a computer program which is executed by a processor to implement the steps of the method of the first aspect.

According to a third aspect, in the present disclosure, there is provided a recognition device, including a processor and a memory. The memory is configured to store a computer program; the processor is configured to execute the program stored in the memory to implement the steps of the method of the first aspect.

The technical solutions provided by the embodiments of the present disclosure at least have the following beneficial effects.

In the embodiments of the present disclosure, the recognition device may extract a feature map of a to-be-recognized image, then determine segmentation information of a text region of the to-be-recognized image based on a preset segmentation network and the feature map, and then determine boundary key points in the text region based on the segmentation information, and then convert a text in the text region into a text with a target arrangement sequence based on the boundary key points and then input the text obtained by conversion into a preset recognition model for recognition processing. In this way, because the boundary key points in the text region are determined to convert a text in the text region into a text with a target arrangement sequence for recognition, curved texts of any shape can be recognized, thereby improving the recognition efficiency and the recognition accuracy of the curved texts.

Furthermore, in the present disclosure, semantic information (arrangement information) of text reading can be learned without performing character-level labeling for the curved texts, and therefore, the accuracy of text detection and recognition can be improved.

Furthermore, in the embodiments of the present disclosure, because a fixed number of detection boxes of boundary key points can be generated, the present disclosure can be applied to labeling tools of texts of any shape, bringing broad application scope.

DETAILED DESCRIPTION OF THE EMBODIMENTS

In order to make the objects, the technical solutions and the advantages of the present disclosure clearer, the embodiments of the present disclosure will be further detailed below in combination with accompanying drawings.

In an embodiment of the present disclosure, there is provided a method of recognizing a text. The execution subject of the method may be a recognition device. The recognition device may be a server or a terminal, the server may be a backstage server having text recognition programs, and the terminal may be a computer where programs for recognizing a text or the like are installed.

A processor, a memory and a transceiver etc. may be disposed in the recognition device. The processor may be a Central Processing Unit (CPU) or the like, which is used to perform a text recognition process, the memory may be a Random Access Memory (RAM) or a Flash or the like which is used to store data required or generated in a text recognition process, and the transceiver is used to receive and send data. When the recognition device is a terminal, the recognition device may further include a display component used to display a recognition result of a text and the like.

Before implementation, application scenarios and terms involved in the embodiments of the present disclosure will be firstly introduced.

Optical Character Recognition (OCR) technology, as an important information collection or input means, can perform input in place of human and liberate laborers and therefore can be applied to multiple scenarios. For example, the OCR technology may be applied to vehicle plate recognition, identity card information recognition, and portable document format (PDF) text analysis and the like. In a general flow of the OCR technology, detection is performed and then recognition is carried out, that is, text region detection is firstly performed for an input image and then text recognition is performed in a detected text region.

Convolutional Neural Network (CNN) is a feed-forward artificial neural network, which extracts feature information of an image by weight sharing and digs deep layers of image features through multiple layers of connections.

Feature Pyramid Network (FPN) is a neural network structure which is usually used in a general target detection with its main purpose of fusing different layers of features to enable a network to fit targets of different scales.

Breadth-First Search (BFS) is a traversal search strategy of a connected graph.

Thin Plate Spline (TPS) is an interpolation algorithm used to deform a raw picture based on a corresponding template.

Figure 1:
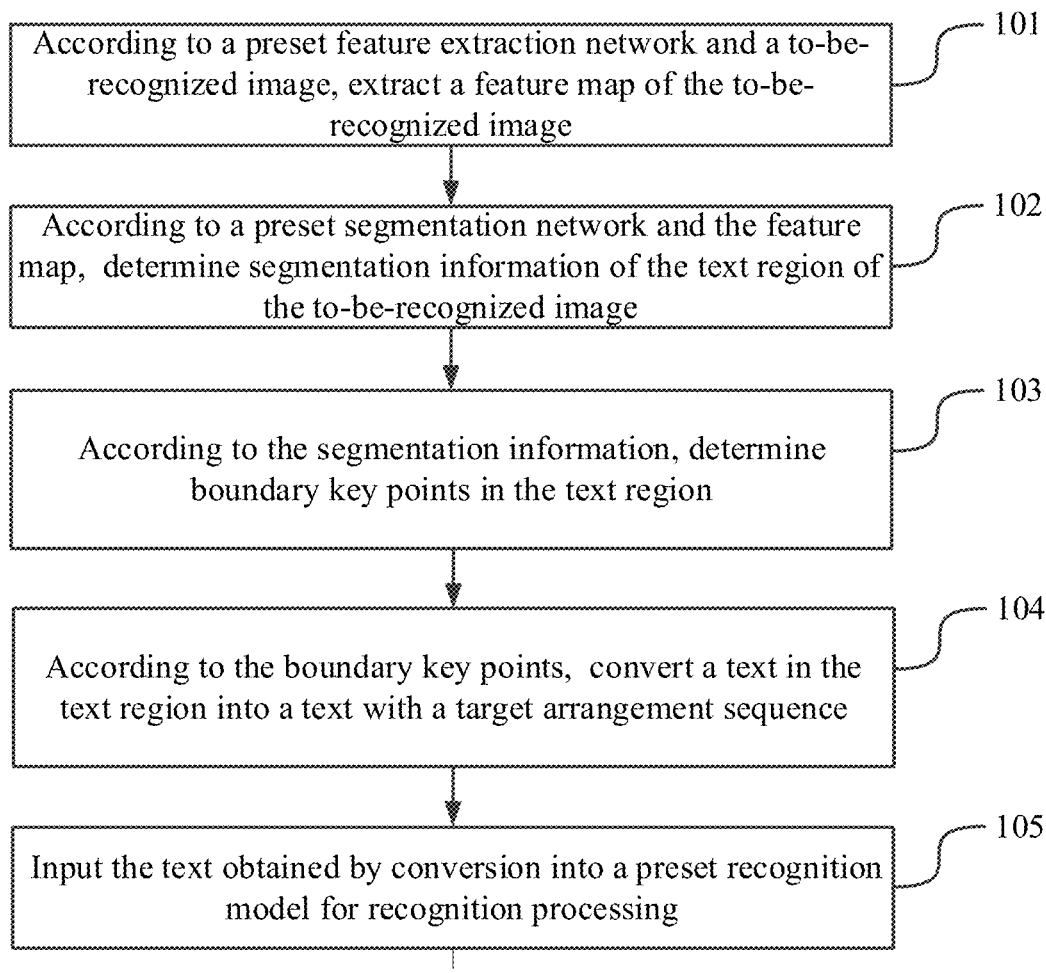
FIG. 1 is a flowchart illustrating a method of recognizing a text according to an embodiment of the present disclosure.

In the present disclosure, there is provided a method of recognizing a text. As shown in FIG. 1, the processing flow of the method is described below with a recognition device as an execution subject.

At step 101, according to a preset feature extraction network and a to-be-recognized image, a feature map of the to-be-recognized image is extracted.

The to-be-recognized image is an image to be subjected to text recognition. The preset feature extraction network may be an FPN which may be obtained by pre-training.

In implementation, when performing text recognition for an image (referred to as to-be-recognized image hereinafter), the recognition device may input the to-be-recognized image into the preset feature extraction network to output a feature map of the to-be-recognized image.

In some examples, fusion processing may be performed to obtain the feature map of the to-be-recognized image, and the corresponding processing of the step 101 is as shown below.

The recognition device inputs the to-be-recognized image into the preset feature extraction network to extract a feature map of a preset size of the to-be-recognized image and performs preset convolutional processing for the feature map of the preset size; performs convolutional kernel correction for the feature map subjected to convolutional processing; obtains the feature map of the to-be-recognized image by performing up-sampling for the feature map subjected to convolutional kernel correction and then performing fusion processing for the up-sampled feature map and an upper layer feature map of the feature map of the preset size.

The preset feature extraction network may be an FPN and RestNet-101 of the FPN may be used.

In implementation, the recognition device may input a to-be-recognized image into the preset feature extraction network for feature extraction to obtain a feature map of a preset size of the to-be-recognized image, and then perform preset convolutional processing for the feature map of the preset size, and then perform convolutional kernel correction for the feature map subjected to convolutional processing to obtain a feature map subjected to convolutional kernel correction.

The recognition device may obtain a feature map of the preset size by performing up-sampling for the feature map subjected to convolutional kernel correction to obtain an up-sampled feature map and then performing fusion processing for the up-sampled feature map and an upper layer feature map of the feature map of the preset size (i.e. perform addition for the feature maps directly). In this way, a feature map corresponding to the to-be-recognized image is obtained for subsequent processing.

Figure 2:
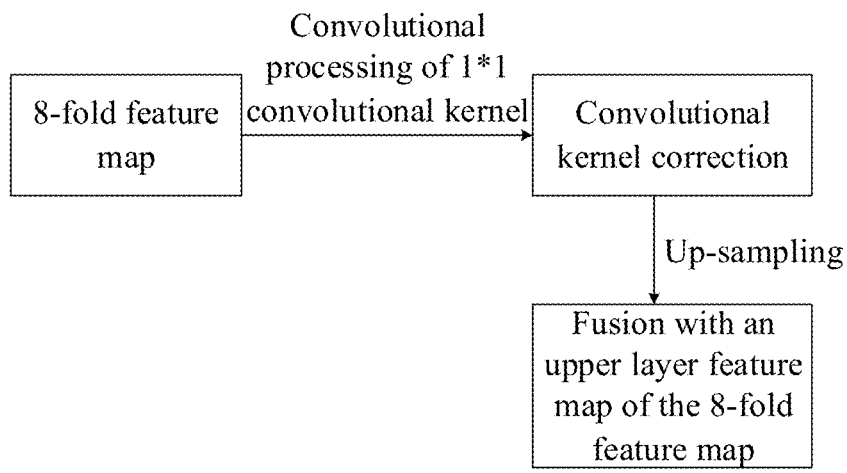
FIG. 2 is a schematic diagram of extracting a feature map according to an embodiment of the present disclosure.

For example, as shown in FIG. 2, the feature map of the preset size may be an 8-fold feature map which is subjected to convolutional processing of 1*1 convolutional kernel, and then to convolutional kernel correction so as to still obtain an 8-fold feature map. The 8-fold feature map is up-sampled to obtain a 4-fold feature map. Since the upper layer feature map of the 8-fold feature map is a 4-fold feature map, the up-sampled 4-fold feature map and the upper layer feature map of the 8-fold feature map may be fused to obtain a 4-fold feature map for subsequent processing. Herein, the x-fold feature map refers to a feature map of 1/x of the size of the original feature map. For example, the 4-fold feature map is a feature map of ¼ of the size of the original feature map, and the 8-fold feature map is a feature map of ⅛ of the size of the original feature map. Therefore, by up-sampling the above 8-fold feature map, a feature map with a size identical to that of the 4-fold feature map can be obtained, and then the up-sampled 4-fold feature map and the upper layer feature map of the 8-fold feature map are fused to obtain a new 4-fold feature map.

It is noted that the above feature map of the preset size may be set based on actual scenario. If the actual scenario contains many small-scale texts, it is required to add a 2-fold feature map, and if the actual scenario contains many large-scale texts, it is required to add a 32-fold feature map.

It is further noted that the to-be-recognized image input into the above preset feature extraction network may be a Red, Green and Blue (RGB) image.

In some examples, convolutional kernel correction of several large convolutional kernels may be performed in the following process:

The recognition device obtains a first feature map by performing convolutional processing of a first convolutional kernel for the feature map subjected to convolutional processing, and obtains a second feature map by performing convolutional processing of a second convolutional kernel for the first feature map; obtains a third feature map by performing convolutional processing of a third convolutional kernel for the second feature map, and obtains a fourth feature map by performing convolutional processing of a fourth convolutional kernel for the second feature map; obtains a fifth feature map by performing channel splicing for the first feature map, the second feature map, the third feature map and the fourth feature map; obtains a feature map subjected to convolutional kernel correction by performing compression activation processing for the fifth feature map;

where the third convolutional kernel has a size of m*n, the fourth convolutional kernel has a size of n*m, m and n are positive integers and m is less than n; m may be 1, n is a positive integer greater than 1, and the value of n is in the range of 7-11.

In implementation, the recognition device may obtain a first feature map by performing convolutional processing of a first convolutional kernel for the feature map subjected to convolutional processing, and obtain a second feature map by performing convolutional processing of a second convolutional kernel for the first feature map, obtain a third feature map by performing convolutional processing of a third convolutional kernel for the second feature map, and obtain a fourth feature map by performing convolutional processing of a fourth convolutional kernel for the second feature map.

Then, a fifth feature map is obtained by performing channel splicing for the first feature map, the second feature map, the third feature map and the fourth feature map. Finally, a feature map subjected to convolutional kernel correction is obtained by performing compression activation processing for the fifth feature map.

Figure 3:
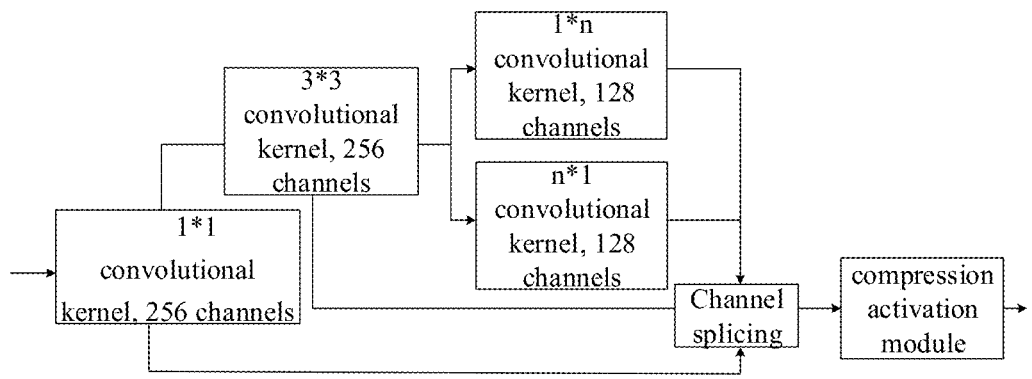
FIG. 3 is a schematic diagram of performing convolutional kernel correction according to an embodiment of the present disclosure.

As shown in FIG. 3, the first convolutional kernel may be 1*1 and have 256 channels, the second convolutional kernel may be 3*3 and have 256 channels, the third convolutional kernel may be 1*n (n is a positive integer of 7-11) and have 128 channels, and the fourth convolutional kernel may be n*1 (n is a positive integer of 7-11) and have 128 channels.

In this case, after the third convolutional kernel 1*n and the fourth convolutional kernel n*1 are adopted, horizontal long text features may be extracted using the third convolutional kernel and longitudinal long text features may be extracted using the fourth convolutional kernel.

At step 102, according to a preset segmentation network and the feature map, segmentation information of the text region of the to-be-recognized image is determined.

The segmentation network may be obtained by pre-training, with its training process described later.

Figure 9:
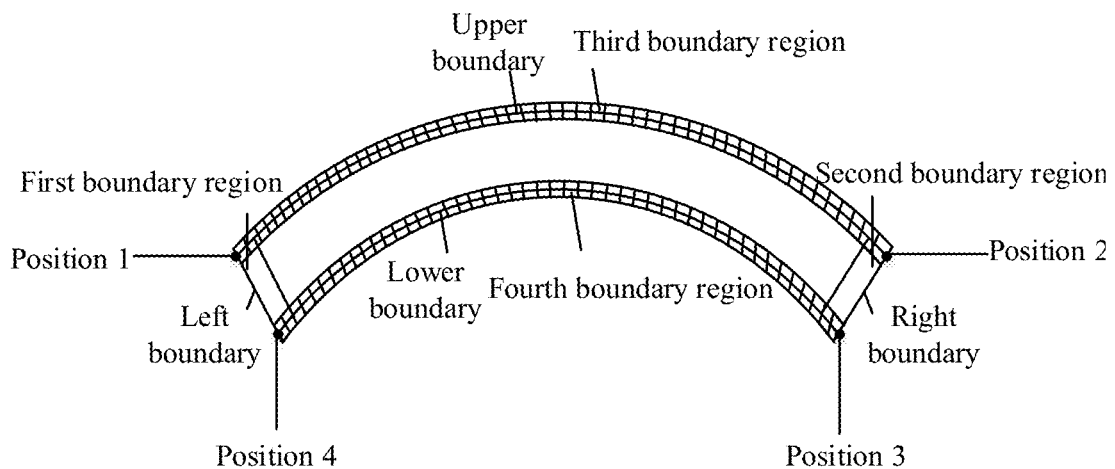
FIG. 9 is a schematic diagram of a region division according to an embodiment of the present disclosure.

In implementation, after obtaining the feature map of the to-be-recognized image, the recognition device may obtain the preset segmentation network and input the feature map of the to-be-recognized image into the segmentation network to output the segmentation information of the text region of the to-be-recognized image. The segmentation information includes a position where each class of region is located in the text region and the class includes a class of the first boundary region (i.e. a class of a head boundary-located region), a class of the second boundary region (i.e. a class of a tail boundary-located region), a class of the third boundary region (i.e. a class of a upper boundary-located region), a class of the fourth boundary region (i.e. a class of a lower region-located region), a class of the text-located region, and a class of the background region. The examples of the first boundary region, the second boundary region, the third boundary region and the fourth boundary region are shown in FIG. 9.

Furthermore, the processing of traversal search algorithm (e.g. BFS) is performed for each text region in the to-be-recognized image. In the search process, all adjacent head boundary-located regions and tail boundary-located regions in the text region are recorded and one group of head boundary-located region and tail boundary-located region having the largest area are selected as the first boundary region and the second boundary region of the text region respectively.

Furthermore, if a text region does not have a tail boundary-located region or a head boundary-located region, the text region is deleted and will no longer be processed subsequently. This is because most misdetections resulting from textures are lack of head boundary-located region or tail boundary-located region.

It is to be noted that, because adjacent text regions will be separated by a boundary, a connected domain of each independent text-class region corresponds to one detected text entity.

Herein, it is further noted that the pixels in the third boundary region and the fourth boundary region may be used as the same class of pixels in training and use of the segmentation network. For example, the pixels in the third boundary region and the fourth boundary region are collectively called the third boundary region in training and use of the segmentation network.

Herein, it is further noted that these different classes of boundaries are in a sequence in a prediction stage, that is, firstly predicted is the text-located region, and then the first boundary region and the second boundary region (the first boundary region and the second boundary region may cover part of the pixels in the text-located region), and finally the third boundary region and the fourth boundary region (the third boundary region and the fourth boundary region may cover part of the pixels in the first boundary region and the second boundary region).

At step 103, according to the segmentation information, boundary key points in the text region are determined.

In implementation, after determining the segmentation information, the recognition device may determine a plurality of boundary key points in the text region by using the segmentation information.

At step 104, according to the boundary key points, a text in the text region is converted into a text with a target arrangement sequence.

The target arrangement sequence may be a sequence from left to right.

Figure 4:
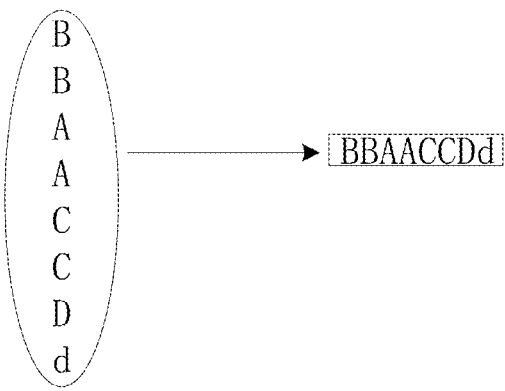
FIG. 4 is a schematic diagram of determining a text conversion according to an embodiment of the present disclosure.

In implementation, the recognition device may convert the text included in the text region into a text with a target arrangement sequence by using the boundary key points in the text region, that is, convert a text facing in different directions into a text with a target arrangement sequence. For example, as shown in FIG. 4, the target arrangement sequence is from left to right. If the text in the text region is in vertical arrangement, the text will be converted into a text from left to right.

In some examples, at step 104, conversion may be performed using TPS and the corresponding processing of the step 104 is described below.

The recognition device performs template matching for the boundary key points using TPS to convert the text in the text region into a text with a target arrangement sequence.

In implementation, if the result of the step 103 is 2*N boundary key points and the input of the preset recognition model is H*W (H is a height of the image and W is a width of the image), position coordinates of the 2*N boundary key points obtained at step 103 may be mapped to the following coordinates one by one:

$$p_i^* = \begin{cases} \left((i-1)*\dfrac{H-2*\Delta x}{N-1} + \Delta x, \Delta y\right), & 1 \le i \le N \\ \left((2*N-i)\times\dfrac{H-2*\Delta x}{N-1} + \Delta x, H - \Delta y\right), & N+1 \le i \le 2*N \end{cases} \quad (1)$$

where, in the formula (1), i is an i-th boundary key point, $\Delta x$ and $\Delta y$ are boundary reserved spaces, $p_i^*$ refers to a coordinate obtained by converting the i-th boundary key point, which may be set to 5-15 pixel points to avoid truncation of the text region by a new template due to excessive deformation.

Figure 5:
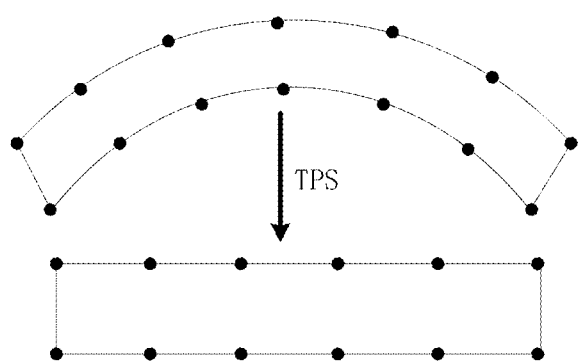
FIG. 5 is a schematic diagram of a TPS processing according to an embodiment of the present disclosure.

After mapping, the text facing in different directions is converted into a text with a target arrangement sequence, such that recognition can be performed using the preset recognition model. As shown in FIG. 5, a curved text region with 14 boundary key points is converted into a text region from left to right by using TPS.

It is to be noted that since the text is converted into a text with one target arrangement sequence by using TPS, the preset recognition model does not need to learn complex deformation parameters subsequently.

At step 105, the text obtained by conversion is input into a preset recognition model for recognition processing.

The preset recognition model may be a pre-trained convolutional neural network (CNN).

In implementation, the recognition device may input the text obtained at step 104 into the preset recognition model to output a recognition result of the text.

In some examples, in step 103, the boundary key points may be determined in the following process.

According to offsets between each pixel point in the first boundary region and two boundary key points in the first boundary region in the segmentation information, position information of the two boundary key points in the first boundary region is determined; and according to offsets between each pixel point in the second boundary region and two boundary key points in the second boundary region in the segmentation information, position information of the two boundary key points in the second boundary region is determined; according to the position information of the two boundary key points in the first boundary region and the position information of the two boundary key points in the second boundary region, other boundary key points other than boundary key points in the first boundary region and boundary key points in the second boundary region in the text region are determined.

The first boundary region is located at the head portion of the text region and may be called head boundary-located region, and the second boundary region is located at the tail portion of the text region and may be called tail boundary-located region. For example, for a text region of a text from left to right, the first boundary region is located at the left side of the text region and called a left boundary-located region, and the second boundary region is located at the right side of the text region and called right boundary-located region. For a text region of a text from up to down, the first boundary region is located at the upper side of the text region and called upper boundary-located region, and the second boundary region is located at the lower side of the text region and called lower boundary-located region.

In implementation, the segmentation information includes offsets between each pixel point in the first boundary region and two boundary key points in the first boundary region (if an boundary key point corresponds to an abscissa and an ordinate, an offset between each pixel point and the boundary key point includes an offset of the abscissa and an offset of the ordinate).

The recognition device may, according to the offsets between each pixel point in the first boundary region and two boundary key points in the first boundary region, determine the position information of the two boundary key points in the first boundary region. One of the two boundary key points in the first boundary region (denoted as $p_1$) may be determined in the following method:

$$p_1 = \left(\dfrac{\sum_{(x_i,y_i)\in R_H}(x_1 + \Delta dx_i)}{\|R_H\|}, \dfrac{\sum_{(x_i,y_i)\in R_H}(y_1 + \Delta dy_i)}{\|R_H\|}\right) \quad (2)$$

where, $R_H$ is the first boundary region, $\|R_H\|$ represents the number of pixel points in the $R_H$ set, $(x_i, y_i)$ is position coordinates of pixel points belonging to the first boundary region, $\Delta dx_i$ is an offset between $x_i$ and $p_1$ along x direction, $\Delta dy_i$ is an offset between $y_i$ and $p_1$ along y direction. Similarly, in this manner, position coordinates of another boundary key point in the first boundary region can be determined.

Likewise, based on the above formula (2), the recognition device may determine the position information of the two boundary key points in the second boundary region by using the offsets between each pixel point in the second boundary region and the two boundary key points in the second boundary region in the segmentation information.

Next, the recognition device may determine other boundary key points other than boundary key points in the first boundary region and boundary key points in the second boundary region in the text region by using the position information of the two boundary key points in the first boundary region and the position information of the two boundary key points in the second boundary region.

It is noted that a rectangular coordinate system is generally established with an upper left corner of the to-be-recognized image as coordinate origin, a rightward direction as x forward direction, a downward direction as y forward direction.

In some examples, when other boundary key points are determined, the arrangement information of the text in the text region is also taken into account. The corresponding processing is as shown below.

The arrangement information of the text in the text region is determined, and according to the arrangement information of the text, the position information of the two boundary key points in the first boundary region and the position information of the two boundary key points in the second boundary region, other boundary key points other than boundary key points in the first boundary region and boundary key points in the second boundary region in the text region are determined.

The arrangement information includes an arrangement from left to right (i.e. horizontal arrangement) and an arrangement from up to down (i.e. longitudinal arrangement).

In implementation, the recognition device may recognize the arrangement information of the text in the text region and then according to the arrangement information, the position information of the two boundary key points in the first boundary region and the position information of the two boundary key points in the second boundary region, determine other boundary key points other than boundary key points in the first boundary region and boundary key points in the second boundary region in the text region.

In some examples, in the embodiments of the present disclosure, there is further provided a manner of determining arrangement information of a text.

A maximum abscissa and a maximum ordinate in the text region are determined, and a minimum abscissa and a minimum ordinate in the text region are determined; according to the maximum abscissa, the maximum ordinate, the minimum abscissa and the minimum ordinate, a circumscribed rectangle of the text region is determined; if a length of the circumscribed rectangle is greater than a width of the circumscribed rectangle, it is determined that the arrangement of the text in the text region is horizontal arrangement, and if the length of the circumscribed rectangle is smaller than the width of the circumscribed rectangle, it is determined that the arrangement of the text in the text region is longitudinal arrangement.

Figure 6:
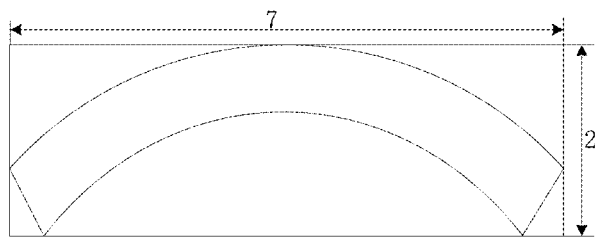
FIG. 6 is a schematic diagram of determining a circumscribed rectangle of a text region according to an embodiment of the present disclosure.

In implementation, the recognition device may determine a maximum abscissa and a maximum ordinate and determine a minimum abscissa and a minimum ordinate at the position coordinate of each pixel point in the text region. The length of the circumscribed rectangle of the text region is obtained by subtracting the minimum abscissa from the maximum abscissa, and the width of the circumscribed rectangle of the text region is obtained by subtracting the minimum ordinate from the maximum ordinate. For example, as shown in FIG. 6, the maximum ordinate is 5, the minimum ordinate is 3, the maximum abscissa is 12, and the minimum abscissa is 5. In this case, the length is 7 and the width is 2.

Next, the sizes of the length and the width of the circumscribed rectangle are determined. If the length is greater than the width, it is determined that the arrangement of the text in the text region is horizontal arrangement; if the length is smaller than the width, it is determined that the arrangement of the text in the text region is longitudinal arrangement.

Furthermore, if the width is equal to the length, the arrangement may be determined as horizontal arrangement and longitudinal arrangement and the respective recognition processings will be carried out subsequently.

In some examples, for different arrangement information, the recognition device may determine other boundary key points in different manners and the corresponding processings are shown below.

If the arrangement information indicates horizontal arrangement, according to the position information of the first boundary key point in the first boundary region and the position information of the second boundary key point in the second boundary region, other boundary key points other than the first boundary key point and the second boundary key point on the upper boundary of the text region are determined, and according to the position information of the fourth boundary key point in the first boundary region and the position information of the third boundary key point in the second boundary region, other boundary key points other than the third boundary key point and the fourth boundary key point on the lower boundary of the text region are determined; if the arrangement information indicates longitudinal arrangement, according to the position information of the first boundary key point in the first boundary region and the position information of the second boundary key point in the second boundary region, other boundary key points other than the first boundary key point and the second boundary key point on the left boundary of the text region are determined, and according to the position information of the fourth boundary key point in the first boundary region and the position information of the third boundary key point in the second boundary region, other boundary key points other than the third boundary key point and the fourth boundary key point on the right boundary of the text region are determined.

The first boundary key point and the fourth boundary key point are located in the first boundary region and the second boundary key point and the third boundary key point are locate in the second boundary region. If the arrangement information indicates horizontal arrangement, the first boundary key point and the second boundary key point are located on the upper boundary of the text region, and the third boundary key point and the fourth boundary key point are located on the lower boundary of the text region. If the arrangement information indicates longitudinal arrangement, the first boundary key point and the second boundary key point are located on the left boundary of the text region, and the third boundary key point and the fourth boundary key point are located on the right boundary of the text region.

In implementation, if the arrangement information indicates horizontal arrangement, the position information of other boundary key points other than the first boundary key point and the second boundary key point on the upper boundary of the text region may be determined using the position information of the first boundary key point and the position information of the second boundary key point, and the position information of other boundary key points other than the third boundary key point and the fourth boundary key point on the lower boundary of the text region may be determined using the position information of the third boundary key point and the position information of the fourth boundary key point.

If the arrangement information indicates longitudinal arrangement, the position information of other boundary key points other than the first boundary key point and the second boundary key point on the left boundary of the text region may be determined using the position information of the first boundary key point and the position information of the second boundary key point, and the position information of other boundary key points other than the third boundary key point and the fourth boundary key point on the right boundary of the text region may be determined using the position information of the third boundary key point and the position information of the fourth boundary key point.

In some examples, the recognition device may determine boundary key points in the following manner and the corresponding processing is shown below.

According to the position information of the first boundary key point in the first boundary region and the position information of the second boundary key point in the second boundary region, first abscissa information of a first preset number of position points is determined, where the first preset number of position points are located on a first connection line and obtained by equally dividing the first connection line to a target value, the target value is equal to the first preset number plus 1, and the first connection line is a line connecting the first boundary key point and the second boundary key point; according to the first abscissa information, other boundary key points other than the first boundary key point and the second boundary key point on the upper boundary of the text region are determined.

The first preset number may be preset and stored in the recognition device.

Figure 7:
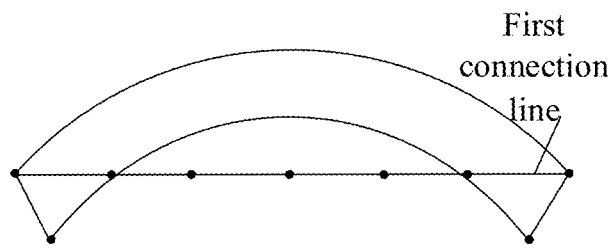
FIG. 7 is a schematic diagram of determining boundary key points according to an embodiment of the present disclosure.

In implementation, when the arrangement information indicates horizontal arrangement, the recognition device may obtain the first connection line by line-connecting the first boundary key point and the second boundary key point, and then obtain the first preset number of position points by equally dividing the first connection line to a target value of parts (the target value is equal to a sum of the first preset number and 1). For example, as shown in FIG. 7, the first preset number is 5, the target value is 6, and thus 5 position points can be obtained by equally dividing the first connection line into 6 parts.

Since the position information of the first boundary key point and the second boundary key point is known, after the first connection line is equally divided into the target value of parts, the abscissas of the first preset number of position points may be determined using the position information of the first boundary key point and the second boundary key point, thereby obtaining the first abscissa information.

Next, by using the first abscissa information, other boundary key points other than the first boundary key point and the second boundary key point on the upper boundary of the text region may be determined.

In some examples, the segmentation information includes an offset between a pixel point belonging to the text in the text region and the upper boundary of the text region; other boundary key points other than the first boundary key point and the second boundary key point on the upper boundary of the text region may be determined in the following manner.

For the first abscissa information of any position point in the first preset number of position points, according to an abscissa interval corresponding to the first abscissa information of the position point, a pixel point belonging to the text and having an abscissa located in the abscissa interval in the text region is determined; the first abscissa information of the position point is determined as an abscissa of a boundary key point corresponding to the position point, and according to an offset between the determined pixel point and the upper boundary, an ordinate of the boundary key point corresponding to the position point is determined, where the boundary key point corresponding to the position point is located on the upper boundary of the text region and the upper boundary includes the first boundary key point and the second boundary key point.

In implementation, for the first abscissa information $x_i$ of any position point i in the first preset number of position points, an abscissa interval $[x_i-a, x_i+a]$ (a may be preset and stored in the recognition device) corresponding to the first abscissa information $x_i$ of the position point i may be determined. Next, the recognition device determines a pixel point belonging to the text and having an abscissa located in the abscissa interval $[x_i-a, x_i+a]$ in the pixel points belonging to the text in the text region.

Next, the first abscissa information $x_i$ of the position point i is determined as an abscissa $x_i$ of a boundary key point corresponding to the position point i. Further, in the segmentation information, a minimum offset between the pixel point belonging to the text and having an abscissa located in the abscissa interval $[x_i-a, x_i+a]$ and the upper boundary is obtained, and an ordinate of the boundary key point corresponding to the position point i is determined using a minimum offset of the offset along y direction. The position coordinate of the boundary key point can be expressed in the following formula:

$$p_i = \left( x_i, \frac{\sum_{(x_i,y_i)\in B_i}(y_i + \Delta dy'_i)}{\|B_i\|} \right) \quad (3)$$

where, in the formula (3), $p_i$ is a position coordinate of the boundary key point corresponding to the position point i, $B_i$ is the first boundary region, $\|B_i\|$ represents the number of the pixel points belonging to the text in the abscissa interval $[x_i-a, x_i+a]$, $y_i$ is an ordinate of a pixel point belonging to the text in the abscissa interval $[x_i-a, x_i+a]$, $\Delta dy'_i$ is a minimum offset between the ordinate $y_i$ of the pixel point belonging to the text in the abscissa interval $[x_i-a, x_i+a]$ and the upper boundary along y direction.

Thus, in the same manner as the position point i, the position coordinates of the boundary key points respectively corresponding to the first preset number of position points may be determined. In this way, other boundary key points other than the first boundary key point and the second boundary key point on the upper boundary can be determined.

In some examples, other boundary key points on the lower boundary may be determined in the following manner and the corresponding processing is shown below.

According to the position information of the fourth boundary key point in the first boundary region and the position information of the third boundary key point in the second boundary region, second abscissa information of a first preset number of position points is determined, where the first preset number of position points are located on a second connection line and obtained by equally dividing the second connection line to a target value, the target value is equal to the first preset number plus 1, and the second connection line is a line connecting the third boundary key point and the fourth boundary key point; according to the second abscissa information, other boundary key points other than the third boundary key point and the fourth boundary key point on the lower boundary of the text region are determined.

The first preset number may be preset and stored in the recognition device.

In implementation, the recognition device may obtain the second connection line by line-connecting the third boundary key point and the fourth boundary key point, and then obtain the first preset number of position points by equally dividing the second connection line to a target value of parts (the target value is equal to a sum of the first preset number and 1).

Since the position information of the third boundary key point and the fourth boundary key point is known, after the second connection line is equally divided into the target value of parts, the abscissas of the first preset number of position points may be determined using the position information of the third boundary key point and the fourth boundary key point, thereby obtaining the second abscissa information.

Next, by using the second abscissa information, other boundary key points other than the third boundary key point and the fourth boundary key point on the lower boundary of the text region may be determined.

In some examples, the recognition device may determine other boundary key points on the lower boundary by using the offset between a pixel point belonging to the text and the lower boundary of the text region in the following process.

For the second abscissa information of any position point in the first preset number of position points, according to an abscissa interval corresponding to the second abscissa information of the position point, a pixel point belonging to the text and having an abscissa located in the abscissa interval in the text region is determined; the second abscissa information of the position point is determined as an abscissa of a boundary key point corresponding to the position point, and according to an offset between the determined pixel point and the lower boundary, an ordinate of the boundary key point corresponding to the position point is determined, where the boundary key point corresponding to the position point is located on the lower boundary of the text region and the lower boundary includes the third boundary key point and the fourth boundary key point.

In implementation, for the second abscissa information $x_j$ of any position point j in the first preset number of position points, an abscissa interval $[x_j-a, x_j+a]$ (a may be preset and stored in the recognition device) corresponding to the second abscissa information of the position point j may be determined. Next, a pixel point belonging to the text and having an abscissa located in the abscissa interval $[x_j-a, x_j+a]$ is determined in the pixel points belonging to the text in the text region.

Next, the second abscissa information $x_j$ of the position point j is determined as an abscissa $x_j$ of a boundary key point corresponding to the position point j. Further, in the segmentation information, a minimum offset between the pixel point belonging to the text and having an abscissa located in the abscissa interval $[x_j-a, x_j+a]$ and the lower boundary is obtained, and an ordinate of the boundary key point corresponding to the position point j is determined using a minimum offset along y direction. The position coordinate of the boundary key point can be expressed in the following formula:

$$p_j = \left(x_j, \frac{\sum_{(x_j,y_j)\in B_j}(y_j + \Delta dy'_j)}{\|B_j\|}\right) \quad (4)$$

where, in the formula (4), $p_j$ is a position coordinate of the boundary key point corresponding to the position point j, $B_j$ is the second boundary region, $\|B_j\|$ represents the number of the pixel points belonging to the text in the abscissa interval $[x_j-a, x_j+a]$, $y_j$ is an ordinate of a pixel point belonging to the text in the abscissa interval $[x_j-a, x_j+a]$, $\Delta dy'_j$ is a minimum offset between the ordinate $y_j$ of the pixel point belonging to the text in the abscissa interval $[x_j-a, x_j+a]$ and the lower boundary along y direction.

Thus, in the same manner as the position point j, the position coordinates of the boundary key points respectively corresponding to the first preset number of position points may be determined. In this way, other boundary key points other than the third boundary key points and the fourth boundary key points on the lower boundary can be determined.

In some examples, when the arrangement information indicates longitudinal arrangement, other boundary key points can be determined in a manner similar to the horizontal arrangement. The process is shown below.

According to the position information of the first boundary key point in the first boundary region and the position information of the second boundary key point in the second boundary region, first ordinate information of a first preset number of position points is determined, where the first preset number of position points are located on a third connection line and obtained by equally dividing the third connection line to a target value, the target value is equal to the first preset number plus 1, and the third connection line is a line connecting the first boundary key point and the second boundary key point; according to the first ordinate information, other boundary key points other than the first boundary key point and the second boundary key point on the left boundary of the text region are determined.

The first preset number may be preset and stored in the recognition device.

In implementation, the recognition device may obtain the third connection line by line-connecting the first boundary key point and the second boundary key point, and then obtain the first preset number of position points by equally dividing the third connection line to a target value of parts (the target value is equal to a sum of the first preset number and 1).

Since the position information of the first boundary key point and the second boundary key point is known, after the third connection line is equally divided into the target value of parts, the ordinates of the first preset number of position points may be determined using the position information of the first boundary key point and the second boundary key point, thereby obtaining the first ordinate information.

Next, by using the first ordinate information, other boundary key points other than the first boundary key point and the second boundary key point on the left boundary of the text region may be determined.

In some examples, the segmentation information includes an offset between a pixel point belonging to the text in the text region and the left boundary of the text region; other boundary key points other than the first boundary key point and the second boundary key point on the left boundary of the text region may be determined in the following manner.

For the first ordinate information of any position point in the first preset number of position points, according to an ordinate interval corresponding to the first ordinate information of the position point, a pixel point belonging to the text and having an ordinate located in the ordinate interval in the text region is determined; the first ordinate information of the position point is determined as an ordinate of a boundary key point corresponding to the position point, and according to an offset between the determined pixel point and the left boundary, an abscissa of the boundary key point corresponding to the position point is determined, where the boundary key point corresponding to the position point is located on the left boundary of the text region and the left boundary includes the first boundary key point and the second boundary key point.

In implementation, for the first ordinate information $y_k$ of any position point k in the first preset number of position points, an ordinate interval $[y_k-a, y_k+a]$ (a may be preset and stored in the recognition device) corresponding to the first ordinate information of the position point k may be determined. Next, a pixel point belonging to the text and having an ordinate located in the ordinate interval $[y\ y_k+a]$ is determined in the pixel points belonging to the text in the text region.

Next, the first ordinate information $y_k$ of the position point k is determined as an ordinate $y_k$ of a boundary key point corresponding to the position point k. Further, in the segmentation information, an offset corresponding to the pixel point belonging to the text and having an ordinate located in the ordinate interval $[y_k-a, y_k+a]$ is obtained, and an abscissa of the boundary key point corresponding to the position point k is determined using the offset. The position coordinate of the boundary key point can be expressed in the following formula:

$$p_k = \left( \frac{\sum_{(x_i,y_i) \in B_k} (x_i + \Delta dx'_i)}{\|B_k\|}, y_k \right) \quad (5)$$

in the formula (5), $p_k$ is a position coordinate of the boundary key point corresponding to the position point k, $B_k$ is the first boundary region, $\|B_k\|$ represents the number of the pixel points belonging to the text in the ordinate interval $[y_k-a, y_k+a]$, $x_i$ is an abscissa of a pixel point belonging to the text in the ordinate interval $[y_k-a, y_k+a]$, $\Delta dx'$ is a minimum offset between the abscissa $x_i$ of the pixel point belonging to the text in the ordinate interval $[y_k-a, y_k+a]$ and the upper boundary along x direction.

Thus, in the same manner as the position point k, the position coordinates of the boundary key points respectively corresponding to the first preset number of position points may be determined. In this way, other boundary key points other than the first boundary key point and the second boundary key point on the left boundary can be determined.

Similarly, other boundary key points other than the third boundary key point and the fourth boundary key point on the right boundary may be determined.

Figure 8:
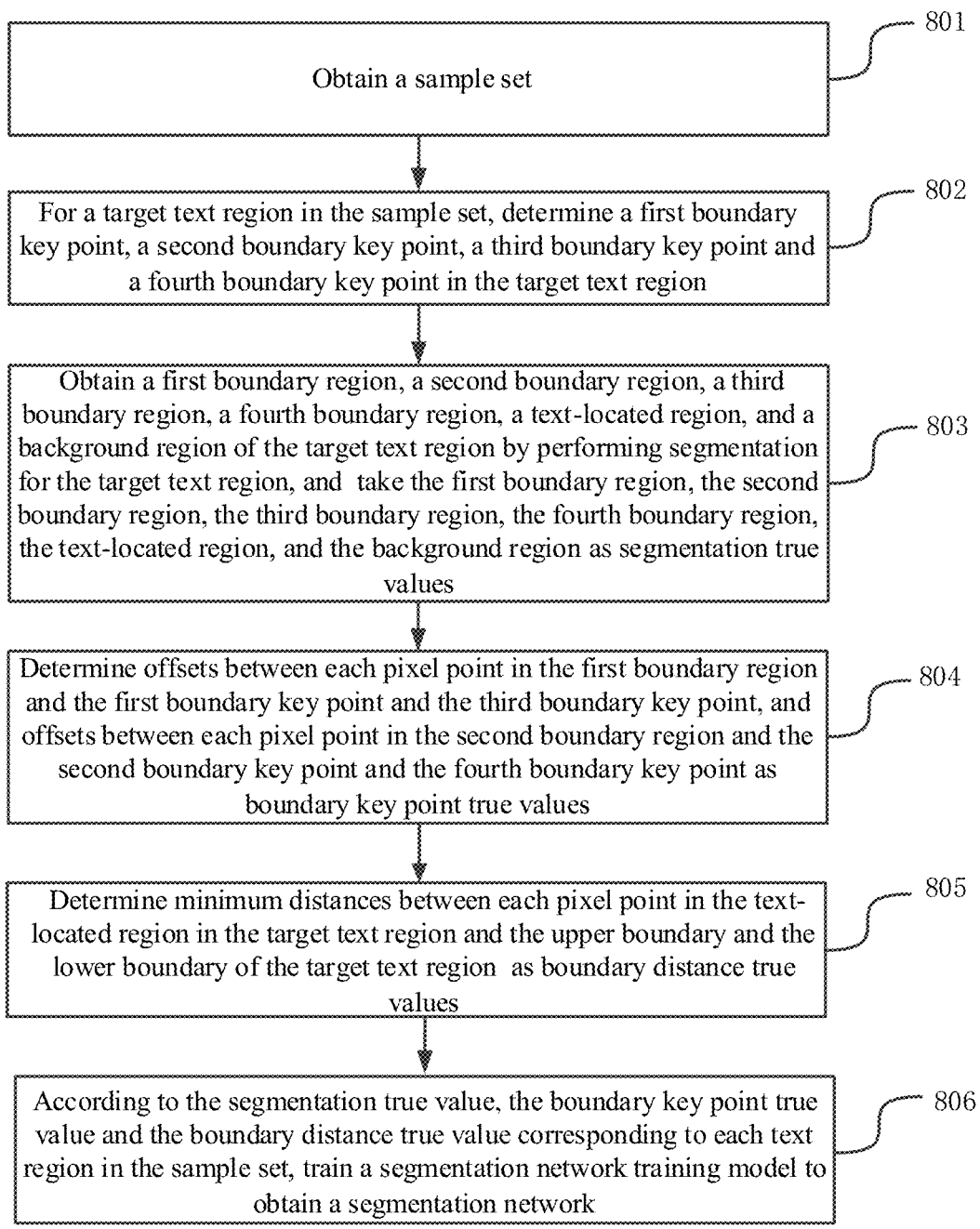
FIG. 8 is a flowchart illustrating a method of training a segmentation network according to an embodiment of the present disclosure.

In some examples, in the embodiments of the present disclosure, there is further provided a process of training a segmentation network. As shown in FIG. 8, the corresponding processing is shown below.

At step 801, a sample set is obtained.

In implementation, the recognition device may obtain the sample set, where the sample set includes a second preset number of images labeling the text region (the second preset number may be preset and usually is larger.).

At step 802, for a target text region in the sample set, a first boundary key point, a second boundary key point, a third boundary key point and a fourth boundary key point in the target text region are determined.

The target text region is any text region in the sample set.

In implementation, for a text region with arrangement information being horizontal arrangement, one text can be labeled by a polygon with clockwise arrangement, and at the same time, and the labeling sequence is always started from the upper left key point in the text. Because the text labeling is always of single row, it is determined that the last boundary key point is surely the lower left boundary key point in the text region. As a result, the first boundary key point is the upper left boundary key point and the fourth boundary key point is the lower left boundary key point. The two boundary key points are a start point and an ending point and thus they can be directly obtained. The second boundary key point and the third boundary key point can be determined in the following formula:

$$\arg\min \; [\gamma(|\angle p_i - 90°| + |\angle p_{i+1} - 90°|) + |\angle p_i + \angle p_{i+1} - 180°|] \quad (6)$$

where, in the formula (6), $\angle p_i$ is an angle with the second boundary key point as vertex, and the right boundary and the upper boundary as sides, $\angle p_{i+1}$ is an angle with the third boundary key point as vertex and the right boundary and the lower boundary as sides, and $\gamma$ is a weight coefficient, which is usually set to 0.5. The formula (6) represents that $\angle p_i$ and $\angle p_{i+1}$ can be obtained when $[\gamma(|\angle p_i-90°|+|\angle p_{i+1}-90°|)+|\angle p_i+\angle p_{i+1}-180°|]$ is minimum. By the formula (6), the second boundary key point can be determined. This is because the angles where the upper right boundary key point and the lower right boundary key point are basically parallel to each other, and the included angle of the right boundary and the upper boundary is approximate to 90 degrees and the included angle of the right boundary and the lower boundary is approximate to 90 degrees. The third boundary key point is a next boundary key point in the second boundary key point. Therefore, in this way, the second boundary key point and the third boundary key point can be determined. Thus, any boundary key point in the target text region can be determined. As shown in FIG. 9, the position 1 is the first boundary key point, the position 2 is the second boundary key point, the position 3 is the third boundary key point and the position 4 is the fourth boundary key point.

For a text region of longitudinal arrangement, the determined boundary key points are moved one position sequentially clockwise, that is, the position 1 corresponds to the upper right boundary key point and the position 2 corresponds to the lower right boundary key point and so on.

At step 803, a first boundary region, a second boundary region, a third boundary region, a fourth boundary region, a text-located region, and a background region of the target text region are obtained by performing segmentation for the target text region, and the first boundary region, the second boundary region, the third boundary region, the fourth boundary region, the text-located region, and the background region are taken as segmentation true values.

In implementation, as shown in FIG. 9, for a text region of horizontal arrangement, after the first boundary key point, the second boundary key point, the third boundary key point and the fourth boundary key point are determined, pixels of a text in the target text region are set to class 1 (text class), i.e. the text-located region, a line connecting the upper left boundary key point and the lower left boundary key point in the text region is made, inwardly expanded by a distance and set to class 2 (head boundary class), i.e. the first boundary region, a line connecting the lower right boundary key point and the upper right boundary key point in the text region is made, inwardly expanded by a distance and set to class 3 (tail boundary class), i.e. the second boundary region, other boundary lines are expanded inwardly and outwardly at the same time to generate a region which is set to class 4 (upper and lower boundary class), i.e, the third boundary region (upper boundary-located region) and the fourth boundary region (lower boundary-located region), and others are set to class 0 (background class).

The first boundary region, the second boundary region, the third boundary region, the fourth boundary region and the text-located region are taken as segmentation true values for subsequent training.

It is to be noted that generation of one class may cover a previous class herein.

At step 804, offsets between each pixel point in the first boundary region and the first boundary key point and the third boundary key point, and offsets between each pixel point in the second boundary region and the second boundary key point and the fourth boundary key point are determined as boundary key point true values.

In implementation, the recognition device may determine a longitudinal offset and a horizontal offset between each pixel point in the first boundary region and the upper left boundary key point, determine a longitudinal offset and a horizontal offset between each pixel point in the first boundary region and the lower left boundary key point, determine a longitudinal offset and a horizontal offset between each pixel point in the second boundary region and the upper right boundary key point, and determine a longitudinal offset and a horizontal offset between each pixel point in the second boundary region and the lower right boundary key point.

The recognition device determines the determined offsets as boundary key point true values.

At step 805, minimum offsets between each pixel point in the text-located region in the target text region and the upper boundary, the lower boundary, the left boundary and the left boundary of the target text region are determined as boundary offset true values.

In implementation, the recognition device may determine a closest offset between each pixel point in the text-located region and the upper boundary, the lower boundary, the left boundary and the right boundary of the target text. For any boundary (one of the upper boundary, the lower boundary, the left boundary and the right boundary) and any pixel point, by using a position coordinate of the pixel point and a position coordinate of any pixel point on the boundary, a distance between the pixel point and the any pixel point on the boundary can be calculated to determine a minimum value of the distances from various pixel points on the boundary, that is, a minimum offset between the pixel point and the boundary. By analogy, a minimum offset between each pixel point in the text-located region in the target text region and the upper boundary, the lower boundary, the left boundary and the right boundary of the target text region may be determined.

The determined offsets are determined as boundary offset true values.

At step 806, according to respective segmentation true value, respective boundary key point true value and respective boundary offset true value corresponding to each text region in the sample set, a segmentation network training model is trained to obtain a segmentation network.

The segmentation network training model is also a FPN.

In implementation, the recognition device may train a preset segmentation network training model by using the segmentation true value, the boundary key point true value and the boundary offset true value corresponding to each text region in the sample set to obtain each parameter value of the segmentation network training model and substitute the parameter value into the segmentation network training model to obtain a segmentation network.

It is noted that a loss generated by each of the above boundary key point true value and boundary region true value is L1 which can be expressed as follows:

$$L = \begin{cases} 0.5(\sigma z)^2, & |z| < \dfrac{1}{\sigma^2} \\ |z| - \dfrac{0.5}{\sigma^2}, & |z| \geq \dfrac{1}{\sigma^2} \end{cases} \quad (7)$$

where, in the formula (7), z represents a offset distance, σ is a constant, the value of which may be 0.3.

During training, a loss ratio corresponding to the segmentation true value, the boundary key point true value and the boundary offset true value is 10:1:1.

It is to be noted that, the above descriptions are mainly made to the curved texts and actually, the embodiments of the present disclosure may also be applied to non-curved texts (i.e. any bar code detection and recognition). The process is the same as the above process of the curved texts and will not be repeated herein.

In the embodiments of the present disclosure, the recognition device may extract a feature map of a to-be-recognized image, then determine segmentation information of a text region of the to-be-recognized image based on a preset segmentation network and the feature map, and then determine boundary key points in the text region based on the segmentation information, and then convert a text in the text region into a text with a target arrangement sequence based on the boundary key points and then input the text obtained by conversion into a preset recognition model for recognition processing. In this way, because the boundary key points in the text region are determined to convert a text in the text region into a text with a target arrangement sequence for recognition, curved texts of any shape can be recognized, thereby improving the recognition efficiency of the curved texts.

Furthermore, in the embodiments of the present disclosure, semantic information (arrangement information) of text reading can be learned without performing character-level labeling for the curved texts, and therefore, the accuracy of text detection and recognition can be improved.

Furthermore, in the embodiments of the present disclosure, because a fixed number of detection boxes of boundary key points can be generated, the present disclosure can be applied to labeling tools of texts of any shape, bringing broad application scope.

Furthermore, in the embodiments of the present disclosure, in the recognition method based segmentation, the classes of boundary regions are increased, and the boundary region is classified into head boundary region and tail boundary region. Therefore, text blocks belonging to different text regions can be segmented and the arrangement sequence of the texts can also be learned.

Figure 10:
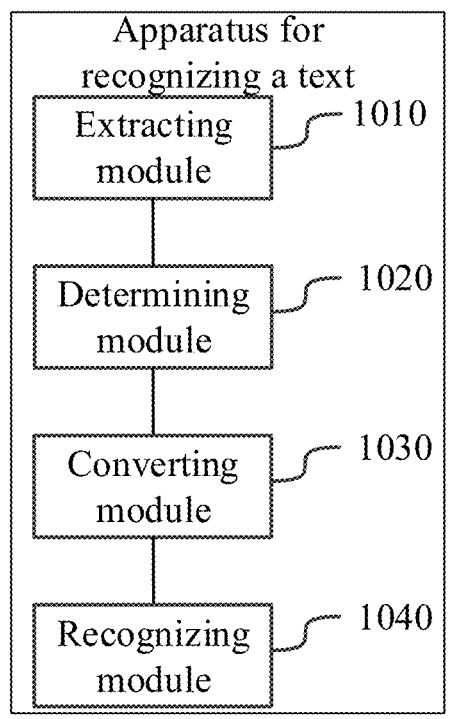
FIG. 10 is a structural schematic diagram illustrating an apparatus for recognizing a text according to an embodiment of the present disclosure.

Based on the same technical idea, in the embodiments of the present disclosure, there is further provided an apparatus for recognizing a text. As shown in FIG. 10, the apparatus includes:

an extracting module 1010, configured to, according to a preset feature extraction network and a to-be-recognized image, extract a feature map of the to-be-recognized image;

a determining module 1020, configured to, according to a preset segmentation network and the feature map, determine segmentation information of a text region of the to-be-recognized image; according to the segmentation information, determine boundary key points in the text region;

a converting module 1030, configured to, according to the boundary key points, convert a text in the text region into a text with a target arrangement sequence;

a recognizing module 1040, configured to input the text obtained by conversion into a preset recognition model for recognition processing.

In some examples, the determining module 1020 is configured to:

according to offsets between each pixel point in a first boundary region and two boundary key points in the first boundary region in the segmentation information, determine position information of the two boundary key points in the first boundary region; and according to offsets between each pixel point in a second boundary region and two boundary key points in the second boundary region in the segmentation information, determine position information of the two boundary key points in the second boundary region, where the first boundary region is located at a head portion of the text region, and the second boundary region is located at a tail portion of the text region;

according to the position information of the two boundary key points in the first boundary region and the position information of the two boundary key points in the second boundary region, determine other boundary key points other than boundary key points in the first boundary region and boundary key points in the second boundary region in the text region.

In some examples, the determining module 1020 is further configured to:

determine arrangement information of the text in the text region;

the determining module 1020 is configured to:

according to the arrangement information of the text, the position information of the two boundary key points in the first boundary region and the position information of the two boundary key points in the second boundary region, determine other boundary key points other than boundary key points in the first boundary region and boundary key points in the second boundary region in the text region.

In some examples, the determining module 1020 is configured to:

if the arrangement information indicates horizontal arrangement, according to the position information of a first boundary key point in the first boundary region and the position information of a second boundary key point in the second boundary region, determine other boundary key points other than the first boundary key point and the second boundary key point on an upper boundary of the text region, and according to the position information of a fourth boundary key point in the first boundary region and the position information of a third boundary key point in the second boundary region, determine other boundary key points other than the third boundary key point and the fourth boundary key point on a lower boundary of the text region;

if the arrangement information indicates longitudinal arrangement, according to the position information of the first boundary key point in the first boundary region and the position information of the second boundary key point in the second boundary region, determine other boundary key points other than the first boundary key point and the second boundary key point on a left boundary of the text region, and according to the position information of the fourth boundary key point in the first boundary region and the position information of the third boundary key point in the second boundary region, determine other boundary key points other than the third boundary key point and the fourth boundary key point on a right boundary of the text region.

In some examples, the determining module 1020 is configured to:

according to the position information of the first boundary key point in the first boundary region and the position information of the second boundary key point in the second boundary region, determine first abscissa information of a first preset number of position points, wherein the first preset number of position points are located on a first connection line and obtained by equally dividing the first connection line to a target value, the target value is equal to the first preset number plus 1, and the first connection line is a line connecting the first boundary key point and the second boundary key point;

according to the first abscissa information, determine other boundary key points other than the first boundary key point and the second boundary key point on the upper boundary of the text region.

In some examples, the segmentation information includes an offset between a pixel point belonging to the text in the text region and the upper boundary of the text region;

the determining module 1020 is configured to:

for the first abscissa information of any position point in the first preset number of position points, according to an abscissa interval corresponding to the first abscissa information of the position point, determine a pixel point belonging to the text and having an abscissa located in the abscissa interval in the text region;

determine the first abscissa information of the position point as an abscissa of a boundary key point corresponding to the position point, and according to an offset between the determined pixel point and the upper boundary, determine an ordinate of the boundary key point corresponding to the position point, where the boundary key point corresponding to the position point is located on the upper boundary of the text region and the upper boundary includes the first boundary key point and the second boundary key point.

In some examples, the determining module 1020 is configured to:

according to the position information of the fourth boundary key point in the first boundary region and the position information of the third boundary key point in the second boundary region, determine second abscissa information of a first preset number of position points, where the first preset number of position points are located on a second connection line and obtained by equally dividing the second connection line to a target value, the target value is equal to the first preset number plus 1, and the second connection line is a line connecting the third boundary key point and the fourth boundary key point;

according to the second abscissa information, determine other boundary key points other than the third boundary key point and the fourth boundary key point on the lower boundary of the text region.

In some examples, the segmentation information includes an offset between a pixel point belonging to the text in the text region and the lower boundary of the text region;

the determining module 1020 is configured to:

for the second abscissa information of any position point in the first preset number of position points, according to an abscissa interval corresponding to the second abscissa information of the position point, determine a pixel point belonging to the text and having an abscissa located in the abscissa interval in the text region;

determine the second abscissa information of the position point as an abscissa of a boundary key point corresponding to the position point, and according to an offset between the determined pixel point and the lower boundary, determine an ordinate of the boundary key point corresponding to the position point, where the boundary key point corresponding to the position point is located on the lower boundary of the text region and the lower boundary includes the third boundary key point and the fourth boundary key point.

In some examples, the converting module 1030 is configured to:

by using Thin Plate Spline (TPS), perform template matching for the boundary key points to convert the text in the text region into a text with a target arrangement sequence.

In some examples, the extracting module 1010 is configured to:

input the to-be-recognized image into the preset feature extraction network to extract a feature map of a preset size of the to-be-recognized image;

perform preset convolutional processing for the feature map of the preset size;

perform convolutional kernel correction for the feature map subjected to convolutional processing;

obtain the feature map of the to-be-recognized image by performing up-sampling for the feature map subjected to convolutional kernel correction and then performing fusion processing for the up-sampled feature map and an upper layer feature map of the feature map of the preset size.

In some examples, the extracting module 1010 is configured to:

obtain a first feature map by performing convolutional processing of a first convolutional kernel for the feature map subjected to convolutional processing, and obtain a second feature map by performing convolutional processing of a second convolutional kernel for the first feature map;

obtain a third feature map by performing convolutional processing of a third convolutional kernel for the second feature map, and obtain a fourth feature map by performing convolutional processing of a fourth convolutional kernel for the second feature map; where the third convolutional kernel has a size of m*n, the fourth convolutional kernel has a size of n*m, m and n are positive integers and m is less than n;

obtain a fifth feature map by performing channel splicing for the first feature map, the second feature map, the third feature map and the fourth feature map;

obtain a feature map subjected to convolutional kernel correction by performing compression activation processing for the fifth feature map.

Figure 11:
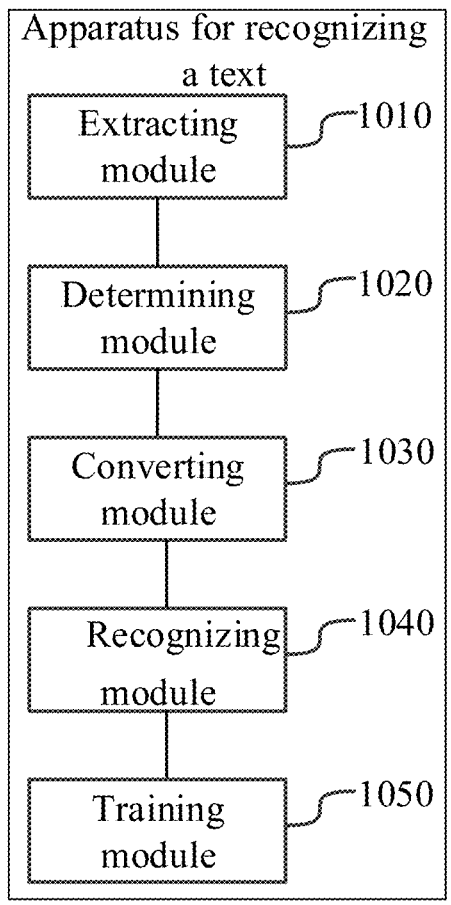
FIG. 11 is a structural schematic diagram illustrating an apparatus for recognizing a text according to an embodiment of the present disclosure.

In some examples, as shown in FIG. 11, the apparatus further includes a training module 1050, configured to:

obtain a sample set, where the sample set includes a second preset number of images labeling the text region;

for a target text region in the sample set, determine a first boundary key point, a second boundary key point, a third boundary key point and a fourth boundary key point in the target text region;

obtain a first boundary region, a second boundary region, a third boundary region, a fourth boundary region, a text-located region, and a background region of the target text region by performing segmentation for the target text region, and take the first boundary region, the second boundary region, the third boundary region, the fourth boundary region, the text-located region, and the background region as segmentation true values;

determine offsets between each pixel point in the first boundary region and the first boundary key point and the third boundary key point, and offsets between each pixel point in the second boundary region and the second boundary key point and the fourth boundary key point as boundary key point true values;

determine minimum offsets between each pixel point in the text-located region in the target text region and the upper boundary, the lower boundary, the left boundary and the left boundary of the target text region as boundary offset true values;

according to respective segmentation true value, respective boundary key point true value and respective boundary offset true value corresponding to each text region in the sample set, train a segmentation network training model to obtain a segmentation network.

In some examples, the determining module 1020 is configured to:

determine a maximum abscissa and a maximum ordinate in the text region, and determine a minimum abscissa and a minimum ordinate in the text region;

according to the maximum abscissa, the maximum ordinate, the minimum abscissa and the minimum ordinate, determine a circumscribed rectangle of the text region;

if a length of the circumscribed rectangle is greater than a width of the circumscribed rectangle, determine that the arrangement of the text in the text region is horizontal arrangement, and if the length of the circumscribed rectangle is smaller than the width of the circumscribed rectangle, determine that the arrangement of the text in the text region is longitudinal arrangement.

In the embodiments of the present disclosure, the recognition device may extract a feature map of a to-be-recognized image, then determine segmentation information of a text region of the to-be-recognized image based on a preset segmentation network and the feature map, and then determine boundary key points in the text region based on the segmentation information, and then convert a text in the text region into a text with a target arrangement sequence based on the boundary key points and then input the text obtained by conversion into a preset recognition model for recognition processing. In this way, because the boundary key points in the text region are determined to convert a text in the text region into a text with a target arrangement sequence for recognition, curved texts of any shape can be recognized, thereby improving the recognition efficiency of the curved texts.

It is noted that, the apparatus for recognizing a text according to the above embodiments is only illustrated with the above division of various functional modules as an example during text recognition and in practical applications, the above functions may be distributed to different functional modules as required, that is, the internal structure of the apparatus is divided into different functional modules to complete all or part of the above functions. Further, the apparatus for recognizing a text in the above embodiments has the same idea as the above embodiments of the method of recognizing a text and therefore, its specific implementation can be referred to the method embodiments and will not be repeated herein.

Figure 12:
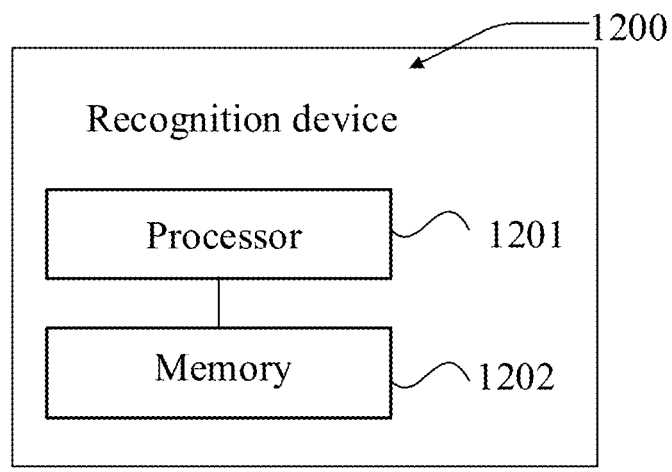
FIG. 12 is a structural schematic diagram illustrating a recognition device according to an embodiment of the present disclosure.

FIG. 12 is a structural schematic diagram illustrating a recognition device according to an embodiment of the present disclosure. The recognition device 1200 may greatly differ due to different configurations or performances and may include one or more central processing units (CPU) 1201 and one or more memories 1202. The memory 1202 stores at least one computer instruction which is loaded and run by the processor 1201 to implement the steps of the above method of recognizing a text.

In an embodiment of the present disclosure there is further provided a computer readable storage medium, storing computer programs, where the computer programs are executed by a processor to implement the steps of the above method of recognizing a text.

In an embodiment of the present disclosure, there is further provided a recognition device for recognizing a text, including a processor and a memory. The memory is configured to store computer programs; the processor is configured to execute the programs stored on the memory to implement the steps of the above method of recognizing a text.

Persons of ordinary skill in the arts may understand that all or part of the steps of the above embodiments may be performed by hardware or by instructing relevant hardware using programs, where the programs may be stored in computer readable storage medium and the storage medium may be a read only memory, magnetic disk or compact disk or the like.

The above descriptions are made only to preferred embodiments of the present disclosure, and shall not be intended to limit the present disclosure. Any modifications, equivalent substitutions and improvements made within the spirit and principle of the present disclosure shall all fall within the scope of protection of the present disclosure.

The invention claimed is:

1. A method of recognizing a text, comprising:
according to a preset feature extraction network and a to-be-recognized image, extracting a feature map of the to-be-recognized image;
providing the feature map to a preset segmentation network, determining segmentation information of a text region of the to-be-recognized image;
according to the segmentation information, determining boundary key points in the text region;
according to the boundary key points, converting a text in the text region into a text with a target arrangement sequence; and
inputting the text obtained by conversion into a preset recognition model for recognition processing;
wherein according to the segmentation information, determining the boundary key points in the text region comprising:
according to offsets between each pixel point in a first boundary region and two boundary key points in the first boundary region in the segmentation information, determining position information of the two boundary key points in the first boundary region; and according to offsets between each pixel point in a second boundary region and two boundary key points in the second boundary region in the segmentation information, determining position information of the two boundary key points in the second boundary region, wherein the first boundary region is located at a head portion of the text region, and the second boundary region is located at a tail portion of the text region; and
according to the position information of the two boundary key points in the first boundary region and the position information of the two boundary key points in the second boundary region, determining other boundary key points other than boundary key points in the first boundary region and boundary key points in the second boundary region in the text region.

2. The method of claim 1, further comprising:
determining arrangement information of the text in the text region;
according to the position information of the two boundary key points in the first boundary region and the position information of the two boundary key points in the second boundary region, determining the other boundary key points other than the boundary key points in the first boundary region and the boundary key points in the second boundary region in the text region comprises:
according to the arrangement information of the text, the position information of the two boundary key points in the first boundary region and the position information of the two boundary key points in the second boundary region, determining other boundary key points other than boundary key points in the first boundary region and boundary key points in the second boundary region in the text region.

3. The method of claim 2, wherein according to the arrangement information of the text, the position information of the two boundary key points in the first boundary region and the position information of the two boundary key points in the second boundary region, determining the other boundary key points other than the boundary key points in the first boundary region and the boundary key points in the second boundary region in the text region comprises:
in response to determining that the arrangement information indicates horizontal arrangement, according to the position information of a first boundary key point in the first boundary region and the position information of a second boundary key point in the second boundary region, determining other boundary key points other than the first boundary key point and the second boundary key point on an upper boundary of the text region, and according to the position information of a fourth boundary key point in the first boundary region and the position information of a third boundary key point in the second boundary region, determining other boundary key points other than the third boundary key point and the fourth boundary key point on a lower boundary of the text region; and
in response to determining that the arrangement information indicates longitudinal arrangement, according to the position information of the first boundary key point in the first boundary region and the position information of the second boundary key point in the second boundary region, determining other boundary key points other than the first boundary key point and the second boundary key point on a left boundary of the text region, and according to the position information of the fourth boundary key point in the first boundary region and the position information of the third boundary key point in the second boundary region, determining other boundary key points other than the third boundary key point and the fourth boundary key point on a right boundary of the text region.

4. The method of claim 3, wherein according to the position information of the first boundary key point in the first boundary region and the position information of the second boundary key point in the second boundary region, determining the other boundary key points other than the first boundary key point and the second boundary key point on the upper boundary of the text region comprises:
according to the position information of the first boundary key point in the first boundary region and the position information of the second boundary key point in the second boundary region, determining first abscissa information of a first preset number of position points, wherein the first preset number of position points are located on a first connection line and obtained by equally dividing the first connection line to a target value, the target value is equal to the first preset number plus 1, and the first connection line is a line connecting the first boundary key point and the second boundary key point; and
according to the first abscissa information, determining other boundary key points other than the first boundary key point and the second boundary key point on the upper boundary of the text region.

5. The method of claim 4, wherein the segmentation information comprises an offset between a pixel point belonging to the text in the text region and the upper boundary of the text region;
according to the first abscissa information, determining the other boundary key points other than the first boundary key point and the second boundary key point on the upper boundary of the text region comprises:
for the first abscissa information of any position point in the first preset number of position points, according to an abscissa interval corresponding to the first abscissa information of the position point, determining a pixel point belonging to the text and having an abscissa located in the abscissa interval in the text region; and determining the first abscissa information of the position point as an abscissa of a boundary key point corresponding to the position point, and according to an offset between the determined pixel point and the upper boundary, determining an ordinate of the boundary key point corresponding to the position point, wherein the boundary key point corresponding to the position point is located on the upper boundary of the text region and the upper boundary comprises the first boundary key point and the second boundary key point.

6. The method of claim 3, wherein according to the position information of the fourth boundary key point in the first boundary region and the position information of the third boundary key point in the second boundary region, determining the other boundary key points other than the third boundary key point and the fourth boundary key point on the lower boundary of the text region comprises:

according to the position information of the fourth boundary key point in the first boundary region and the position information of the third boundary key point in the second boundary region, determining second abscissa information of a first preset number of position points, wherein the first preset number of position points are located on a second connection line and obtained by equally dividing the second connection line to a target value, the target value is equal to the first preset number plus 1, and the second connection line is a line connecting the third boundary key point and the fourth boundary key point; and according to the second abscissa information, determining other boundary key points other than the third boundary key point and the fourth boundary key point on the lower boundary of the text region.

7. The method of claim 6, wherein the segmentation information comprises an offset between a pixel point belonging to the text in the text region and the lower boundary of the text region;

according to the second abscissa information, determining the other boundary key points other than the third boundary key point and the fourth boundary key point on the lower boundary of the text region comprises:

for the second abscissa information of any position point in the first preset number of position points, according to an abscissa interval corresponding to the second abscissa information of the position point, determining a pixel point belonging to the text and having an abscissa located in the abscissa interval in the text region; and determining the second abscissa information of the position point as an abscissa of a boundary key point corresponding to the position point, and according to an offset between the determined pixel point and the lower boundary, determining an ordinate of the boundary key point corresponding to the position point, wherein the boundary key point corresponding to the position point is located on the lower boundary of the text region and the lower boundary comprises the third boundary key point and the fourth boundary key point.

8. The method of claim 2, wherein determining the arrangement information of the text in the text region comprises:

determining a maximum abscissa and a maximum ordinate in the text region, and determining a minimum abscissa and a minimum ordinate in the text region;

according to the maximum abscissa, the maximum ordinate, the minimum abscissa and the minimum ordinate, determining a circumscribed rectangle of the text region; and in response to determining that a length of the circumscribed rectangle is greater than a width of the circumscribed rectangle, determining that the arrangement of the text in the text region is horizontal arrangement, and in response to determining that the length of the circumscribed rectangle is smaller than the width of the circumscribed rectangle, determining that the arrangement of the text in the text region is longitudinal arrangement.

9. The method of claim 1, wherein according to the boundary key points, converting the text in the text region into the text with the target arrangement sequence comprises:

by using Thin Plate Spline (TPS), performing template matching for the boundary key points to convert the text in the text region into a text with a target arrangement sequence.

10. The method of claim 1, wherein according to the preset feature extraction network and the to-be-recognized image, extracting the feature map of the to-be-recognized image comprises:

inputting the to-be-recognized image into the preset feature extraction network to extract a feature map of a preset size of the to-be-recognized image;

performing preset convolutional processing for the feature map of the preset size;

performing convolutional kernel correction for the feature map subjected to convolutional processing; and obtaining the feature map of the to-be-recognized image by performing up-sampling for the feature map subjected to convolutional kernel correction and then performing fusion processing for the up-sampled feature map and an upper layer feature map of the feature map of the preset size.

11. The method of claim 10, wherein performing convolutional kernel correction for the feature map subjected to convolutional processing comprises:

obtaining a first feature map by performing convolutional processing of a first convolutional kernel for the feature map subjected to convolutional processing, and obtaining a second feature map by performing convolutional processing of a second convolutional kernel for the first feature map;

obtaining a third feature map by performing convolutional processing of a third convolutional kernel for the second feature map, and obtaining a fourth feature map by performing convolutional processing of a fourth convolutional kernel for the second feature map; wherein the third convolutional kernel has a size of m*n, the fourth convolutional kernel has a size of n*m, m and n are positive integers and m is less than n;

obtaining a fifth feature map by performing channel splicing for the first feature map, the second feature map, the third feature map and the fourth feature map; and obtaining a feature map subjected to convolutional kernel correction by performing compression activation processing for the fifth feature map.

12. The method of claim 1, further comprising:

obtaining a sample set, wherein the sample set comprises a second preset number of images labeling the text region;

for a target text region in the sample set, determining a first boundary key point, a second boundary key point, a third boundary key point and a fourth boundary key point in the target text region;

obtaining a first boundary region, a second boundary region, a third boundary region, a fourth boundary region, a text-located region, and a background region of the target text region by performing segmentation for the target text region, and taking the first boundary region, the second boundary region, the third boundary region, the fourth boundary region, the text-located region, and the background region as segmentation true values;

determining offsets between each pixel point in the first boundary region and the first boundary key point and the third boundary key point, and offsets between each pixel point in the second boundary region and the second boundary key point and the fourth boundary key point as boundary key point true values;

determining minimum offsets between each pixel point in the text-located region in the target text region and the upper boundary, the lower boundary, the left boundary and the left boundary of the target text region as boundary offset true values; and according to respective segmentation true value, respective boundary key point true value and respective boundary offset true value corresponding to each text region in the sample set, training a segmentation network training model to obtain a segmentation network.

13. A recognition device, wherein the recognition device comprises a processor and a memory, the memory stores at least one computer instruction and the at least one computer instruction is loaded and run by the processor to implement operations comprising:

according to a preset feature extraction network and a to-be-recognized image, extracting a feature map of the to-be-recognized image;

providing the feature map to a preset segmentation network , determining segmentation information of a text region of the to-be-recognized image;

according to the segmentation information, determining boundary key points in the text region;

according to the boundary key points, converting a text in the text region into a text with a target arrangement sequence; and inputting the text obtained by conversion into a preset recognition model for recognition processing, wherein according to the segmentation information, determining the boundary key points in the text region comprising:

according to offsets between each pixel point in a first boundary region and two boundary key points in the first boundary region in the segmentation information, determining position information of the two boundary key points in the first boundary region; and according to offsets between each pixel point in a second boundary region and two boundary key points in the second boundary region in the segmentation information, determining position information of the two boundary key points in the second boundary region, wherein the first boundary region is located at a head portion of the text region, and the second boundary region is located at a tail portion of the text region; and according to the position information of the two boundary key points in the first boundary region and the position information of the two boundary key points in the second boundary region, determining other boundary key points other than boundary key points in the first boundary region and boundary key points in the second boundary region in the text region.

14. A non-transitory computer readable storage medium, wherein the computer readable storage medium stores at least one computer instruction which is loaded and run by a processor to implement operations comprising:

according to a preset feature extraction network and a to-be-recognized image, extracting a feature map of the to-be-recognized image;

providing the feature map to a preset segmentation network, determining segmentation information of a text region of the to-be-recognized image;

according to the segmentation information, determining boundary key points in the text region;

according to the boundary key points, converting a text in the text region into a text with a target arrangement sequence; and inputting the text obtained by conversion into a preset recognition model for recognition processing;

wherein according to the segmentation information, determining the boundary key points in the text region comprising:

according to offsets between each pixel point in a first boundary region and two boundary key points in the first boundary region in the segmentation information, determining position information of the two boundary key points in the first boundary region; and according to offsets between each pixel point in a second boundary region and two boundary key points in the second boundary region in the segmentation information, determining position information of the two boundary key points in the second boundary region, wherein the first boundary region is located at a head portion of the text region, and the second boundary region is located at a tail portion of the text region; and according to the position information of the two boundary key points in the first boundary region and the position information of the two boundary key points in the second boundary region, determining other boundary key points other than boundary key points in the first boundary region and boundary key points in the second boundary region in the text region.

15. The recognition device of claim 14, wherein the processor is configured to:

determine arrangement information of the text in the text region;

according to the position information of the two boundary key points in the first boundary region and the position information of the two boundary key points in the second boundary region, determine the other boundary key points other than the boundary key points in the first boundary region and the boundary key points in the second boundary region in the text region comprises:

according to the arrangement information of the text, the position information of the two boundary key points in the first boundary region and the position information of the two boundary key points in the second boundary region, determining other boundary key points other than boundary key points in the first boundary region and boundary key points in the second boundary region in the text region.

16. The recognition device of claim 15, wherein according to the arrangement information of the text, the position information of the two boundary key points in the first boundary region and the position information of the two boundary key points in the second boundary region, determining the other boundary key points other than the boundary key points in the first boundary region and the boundary key points in the second boundary region in the text region comprises:

in response to determining that the arrangement information indicates horizontal arrangement, according to the position information of a first boundary key point in the first boundary region and the position information of a second boundary key point in the second boundary region, determining other boundary key points other than the first boundary key point and the second boundary key point on an upper boundary of the text region, and according to the position information of a fourth boundary key point in the first boundary region and the position information of a third boundary key point in the second boundary region, determining other boundary key points other than the third boundary key point and the fourth boundary key point on a lower boundary of the text region; and in response to determining that the arrangement information indicates longitudinal arrangement, according to the position information of the first boundary key point in the first boundary region and the position information of the second boundary key point in the second boundary region, determining other boundary key points other than the first boundary key point and the second boundary key point on a left boundary of the text region, and according to the position information of the fourth boundary key point in the first boundary region and the position information of the third boundary key point in the second boundary region, determining other boundary key points other than the third boundary key point and the fourth boundary key point on a right boundary of the text region.

17. The recognition device of claim 16, wherein according to the position information of the first boundary key point in the first boundary region and the position information of the second boundary key point in the second boundary region, determining the other boundary key points other than the first boundary key point and the second boundary key point on the upper boundary of the text region comprises:

according to the position information of the first boundary key point in the first boundary region and the position information of the second boundary key point in the second boundary region, determining first abscissa information of a first preset number of position points, wherein the first preset number of position points are located on a first connection line and obtained by equally dividing the first connection line to a target value, the target value is equal to the first preset number plus 1, and the first connection line is a line connecting the first boundary key point and the second boundary key point; and according to the first abscissa information, determining other boundary key points other than the first boundary key point and the second boundary key point on the upper boundary of the text region.

18. The recognition device of claim 17, wherein the segmentation information comprises an offset between a pixel point belonging to the text in the text region and the upper boundary of the text region;

according to the first abscissa information, determining the other boundary key points other than the first boundary key point and the second boundary key point on the upper boundary of the text region comprises:

for the first abscissa information of any position point in the first preset number of position points, according to an abscissa interval corresponding to the first abscissa information of the position point, determining a pixel point belonging to the text and having an abscissa located in the abscissa interval in the text region; and determining the first abscissa information of the position point as an abscissa of a boundary key point corresponding to the position point, and according to an offset between the determined pixel point and the upper boundary, determining an ordinate of the boundary key point corresponding to the position point, wherein the boundary key point corresponding to the position point is located on the upper boundary of the text region and the upper boundary comprises the first boundary key point and the second boundary key point.

* * * * *